July 20, 1937.  E. SCHAER  2,087,414
COIL CLEANING DEVICE
Filed June 29, 1935
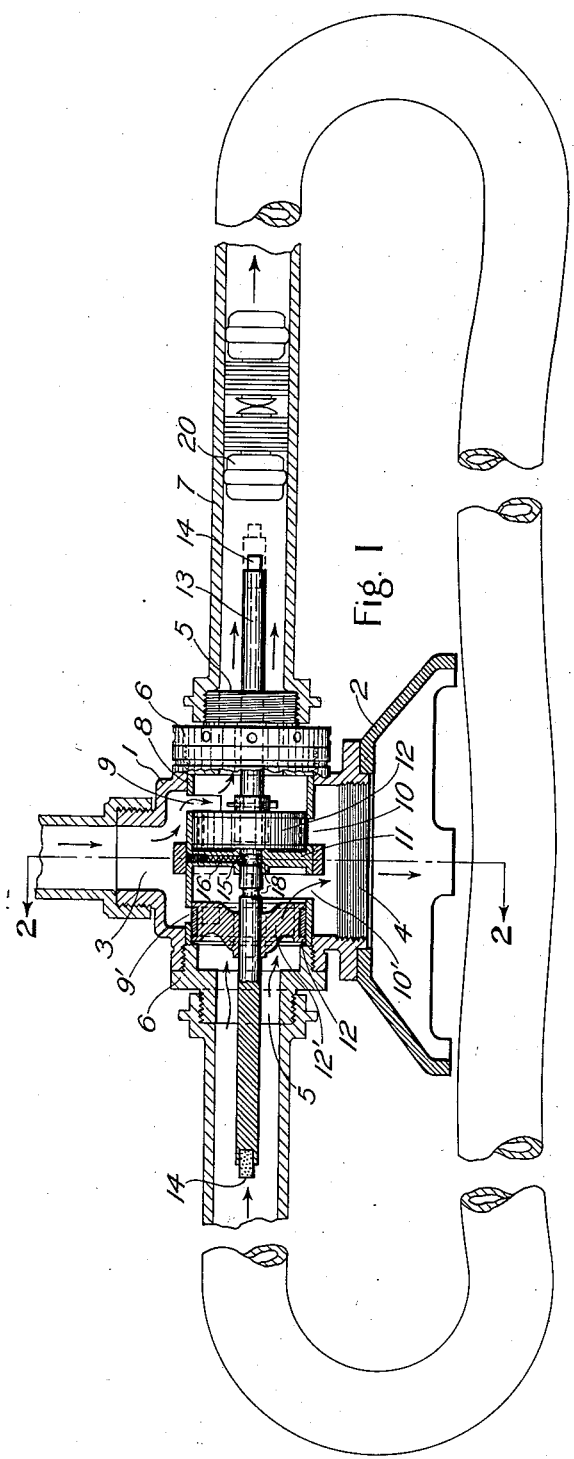
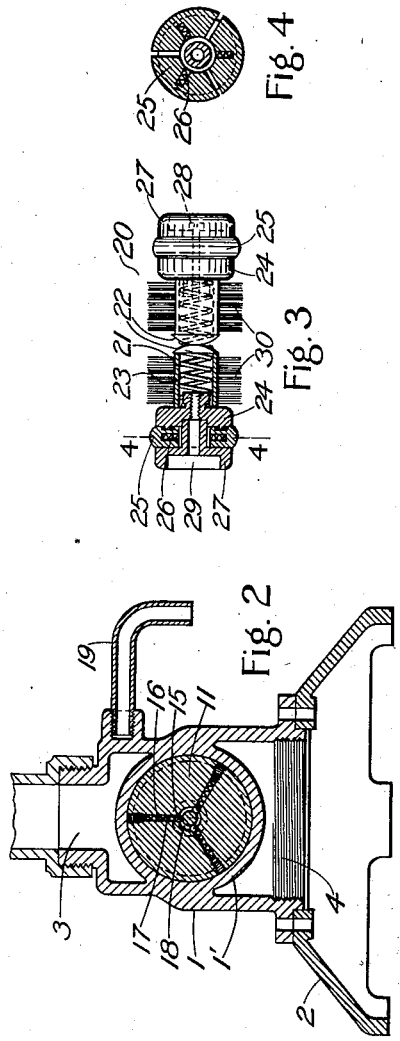
INVENTOR:
EUGENE SCHAER
By Alex E. MacRae
Attorney.

Patented July 20, 1937

2,087,414

UNITED STATES PATENT OFFICE 2,087,414

COIL CLEANING DEVICE

Eugene Schaer, Fort Frances, Ontario, Canada

Application June 29, 1935, Serial No. 29,060
In Canada May 9, 1935

2 Claims. (Cl. 225—12)

This invention relates to a cleaning device for hose, pipes, coils and the like and particularly to an automatic cleaner for brewers' beer hose and pipes.

The object of the invention is to provide a cleaning device which is effective in action and completely automatic in operation.

The invention comprises broadly a valve housing including passageways connecting the valve with a pipe or hose to be cleaned, means connecting the passageways with a source of water supply, valve means for reversing the flow of water through the passageways and a cleansing body for the pipe or hose, said cleansing body being adapted to actuate the valve means.

Referring to the accompanying drawing,

Figure 1 is a sectional elevation of the cleaning device,

Figure 2 is a section on line 2—2 of Figure 1,

Figure 3 is a sectional elevation of the cleansing body, and

Figure 4 is a section on line 4—4 of Figure 3.

In the drawing, 1 is the main valve housing mounted on a stand 2 and provided with an inlet port 3 and an outlet port 4. The housing 1 is also provided with a pair of ports 5 into which are screwed the bushings 6 forming connections for the opposite ends of the hose 7 to be cleaned.

Mounted within the housing 1 is an open ended hollow sylinder 8 preferably supported by a ring 1' formed integral with the housing. The cylinder 8 is provided with a pair of inlet ports 9 and 9' and a pair of outlet ports 10 and 10'. A wall 11 is formed at the centre of the cylinder 8.

A pair of valve sleeves 12 carried by the shaft 13 are mounted for reciprocation in the cylinder 8 and are adapted to close or open ports 9 and 9' and 10 and 10'. The sleeves are open-ended being supported by the webs 12'. The shaft 13 extends centrally through the ports 5 and through an opening in the wall 11 and is provided with a rubber cushion 14 at each end.

Means are provided for accurately positioning the sleeves 12 in two operative positions comprising several metal balls 15 located in openings 16 formed in the wall 11, normally urged inwardly by springs 17, and adapted to slidingly engage the surface of shaft 13 and cooperate with grooves 18 formed in the shaft.

A handle or supporting lug 19 may be mounted on the housing 1.

A cleansing body or brush 20, adapted for propulsion through the pipe or hose 7 to thereby frictionally clean the same, is provided. This cleasing body, as shown in Figure 3, includes a hollow cylindrical portion 21 formed in two parts having engagement with each other through bevelled washers 22 mounted on their inner ends. A spring 23 is positioned within the cylindrical portion 21 and resiliently connects the two parts thereof. The ends of the spring 23 are fixed to retaining rings 24 located at each end of the cylinder 21. Water seal expansion rings 25 are positioned adjacent the rings 24 and may consist of three segmental parts normally urged outwardly by springs 26 located in inner openings in the rings 25 with their inner ends engaging sleeve portions of main outer retaining rings 27. Screws 28 serve to hold the assembly together. Propelling cups 29 are formed in the rings 27. A frictional cleansing medium is mounted on the outer surface of the cylinder 21 and as shown in the present instance may comprise the bristles 30. Any other suitable medium such as sponge rubber may of course be employed.

In operation, the ends of the hose or pipe 7 to be cleaned are connected to the bushings 6 and the inlet port 3 is connected to a source of water supply, which may be the usual water line or to a pump. With the parts in the position shown in Figure 1, water under the usual line pressure, enters the port 3, flows through port 9 into the right hand end of cylinder 8, out of port 5 into the hose 7, and engages the cupped end portion of the brush 20 to thus propel the same through the hose. Unclean liquid in the hose is forced ahead of the brush into the opposite end of cylinder 8 through a sleeve 12 and escapes through outlets 10' and 4. When the brush 20 arrives at the other end of the hose it engages a cushioned end of shaft 13 and moves the same, together with the sleeves 12 to its second position, thus closing ports 9 and 10' and opening ports 9' and 10. Water then flows through port 9' and out of the other port 5 into the opposite end of hose 7 to force the brush 20 back through the hose. The brush thus automatically travels back and forth throughout the hose circuit. The bristles 30 cleanse the inside of the hose of slime and sediment and the water thoroughly flushes out the same. The expansion rings 25 maintain the brush in water sealing engagement with the inner surface of the hose whereby the brush may be rapidly propelled through the hose. The cups 29 also aid in the propulsion of the brush. The resilient joint in the brush formed by the spring 23 and bevelled washers 22 enables the brush to flexibly negotiate loops and coils in the hose with ease.

When clear water is expelled at the outlet ports, it is evident that the hose has been completely cleaned.

If desired, a sterilizing solution may be employed instead of water.

It will be obvious that various modifications may be made in the design of the various parts of the device without departing from the spirit of the invention as defined in the appended claims.

I claim:

1. In a cleaning device for hose, pipes and the like, a valve housing having an inlet and an outlet, passageways connecting the housing with a pipe or hose to be cleaned, a cylindrical valve member in the housing having open ends communicating with said passageways and a wall intermediate said ends, ports in said valve member communicating with said inlet, ports in said valve member communicating with said outlet, a plurality of valve sleeves reciprocally mounted in said housing and adapted to alternately close certain of said ports to interconnect the inlet and one of said passageways and one of said passageways and the outlet, a valve stem axially mounted in said sleeves and adapted to actuate the same, and means for positively positioning said valve sleeves in a plurality of operative positions, said means comprising ball bearings mounted within said wall and having resilient bearing contact with said valve stem, said valve stem having grooves adapted to receive said bearings.

2. In a cleaning device for hose, pipes and the like, a valve housing having an inlet and an outlet, passageways connecting the housing with a hose or pipe to be cleaned, a plurality of valve sleeves reciprocally mounted within said housing and adapted to provide communication between the inlet and one of said passageways and one of said passageways and the outlet, a valve stem mounted within said housing and axially carrying said valve sleeves, means for actuating said valve stem to place said valve sleeves in a plurality of operating positions, and means for positively positioning said valve stem in a plurality of fixed positions.

EUGENE SCHAER.